United States Patent
Ryan et al.

(10) Patent No.: US 6,390,502 B1
(45) Date of Patent: May 21, 2002

(54) SUPPLEMENTAL RESTRAINT ASSEMBLY FOR AN AUTOMOTIVE VEHICLE

(75) Inventors: Shawn Gregory Ryan, Dayton; Connie M. Hardig, Cincinnati; Margaret Ann Fisher, Huber Heights, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/817,783

(22) Filed: Mar. 26, 2001

(51) Int. Cl.[7] .............................................. B60R 21/16
(52) U.S. Cl. ............................ 280/743.2; 280/730.1; 280/730.2; 280/743.1
(58) Field of Search ........................ 280/743.1, 743.2, 280/730.1, 730.2

(56) References Cited

U.S. PATENT DOCUMENTS

| | | | | |
|---|---|---|---|---|
| 3,687,485 A | * | 8/1972 | Campbell ................ | 280/733 |
| 5,865,462 A | * | 2/1999 | Robins et al. ........... | 280/730.2 |
| 6,095,551 A | * | 8/2000 | O'Docherty ............. | 280/730.2 |
| 6,152,481 A | * | 11/2000 | Webber et al. ........... | 280/730.2 |
| 6,155,597 A | * | 12/2000 | Bowers et al. ........... | 280/730.2 |
| 6,168,191 B1 | * | 1/2001 | Webber et al. ........... | 280/730.2 |
| 6,203,058 B1 | * | 3/2001 | Elqadah et al. .......... | 280/730.2 |
| 6,237,938 B1 | * | 5/2001 | Boxey .................... | 280/730.2 |
| 6,237,939 B1 | * | 5/2001 | Resh ...................... | 280/730.2 |
| 6,237,941 B1 | * | 5/2001 | Bailey et al. ............ | 280/730.2 |
| 6,273,458 B1 | * | 8/2001 | Steffens et al. .......... | 280/730.2 |
| 6,299,199 B1 | * | 10/2001 | Bowers et al. ........... | 280/730.2 |

* cited by examiner

*Primary Examiner*—Brian L. Johnson
*Assistant Examiner*—Deanna Draper
(74) *Attorney, Agent, or Firm*—Kathryn A. Marra

(57) ABSTRACT

A supplemental restraint assembly for a vehicle having a side impact air bag with an interwoven self-tensioning tether/lace. A side air bag is secured to the vehicle roof rail between the front and rear pillars. A tether/lace extends between and is secured to the front and rear pillars. The tether/lace is secured to the air bag and traverses a plurality of spaced-apart guides formed at discrete points along the air bag. When the side impact air bag is inflated the distance between the guides increases thereby taking up slack in the tether/lace thereby inducing tension therein. The air bag is thus held firmly in place when inflated and allows the tether/lace to be stored up through the pillars and along the roof rail in a non-deployed stored state.

13 Claims, 6 Drawing Sheets

SUPPLEMENTAL RESTRAINT ASSEMBLY FOR AN AUTOMOTIVE VEHICLE

FIELD OF THE INVENTION

This invention relates to a supplemental restraint assembly for an automotive vehicle and more particularly to a self-tensioning side impact air bag assembly.

DESCRIPTION OF THE RELATED ART

Air bags mounted in an instrument panel or steering wheel to protect an occupant from a front impact have become standard in the automotive industry. Numerous variations of these air bags, deployment systems and housing devices have evolved over the years. However, these frontal air bags do not provide protection to the occupant during a side impact. Recent developments have focussed on technology directed to side impact air bags and related systems.

Side impact air bag systems are also known in the art. These side impact air bags are often mounted adjacent the vehicle's roof rail, doorframe or center pillars, or in some instances within the side door. It is desirable to have tensioning to position the bag during side impact as well as any secondary events.

FIGS. 7A and 7B depict a side impact air bag 1 of the related art. The air bag 1 has a top edge 3 and a lower edge 4. A front tether 5 and rear tether 6 connects the inflatable element 2 to corresponding front and rear pillars of an automotive vehicle. The top edge 3 has a plurality of mounting connections 7 for connection to the vehicle's roof rail. The air bag 1 may have a plurality of straight substantially square zero length tethers 8 extending from the lower edge 4 to the top edge 3. FIG. 6B depicts the air bag of FIG. 6A in an inflated state. The inflatable element 2 shrinks when inflated and induces tension in the lower edge 4 and the tethers 5, 6. This tension tends to hold the air bag 1 in place relative to the vehicle. However, the amount that the lower edge 4 may constrict is limited and therefore, the amount of tension and take up in the tethers 5,6 is limited to the amount that the lower edge 4 constricts during inflation.

SUMMARY OF THE INVENTION

It is an object of the invention to provide an improved supplemental restraint assembly that improves upon the related art.

The present invention is directed to a side impact air bag with a self-tensioning tether/lace interlaced within the side air bag. A side air bag is secured to the vehicle along the roof rail between the front and rear pillars. A tether or lace is secured to the air bag and traverses a plurality of predetermined guide points. When the side impact air bag is inflated the distance between the guide points increases and any slack in the tether/lace is taken up. Thus the air bag is securely held in place when deployed. The side impact airbag, under some circumstances, serves to mitigate the threat of an occupant being ejected during a roll over event or subsequent impact.

DESCRIPTION OF THE PREFERRED EMBODIMENT

Figure 1:
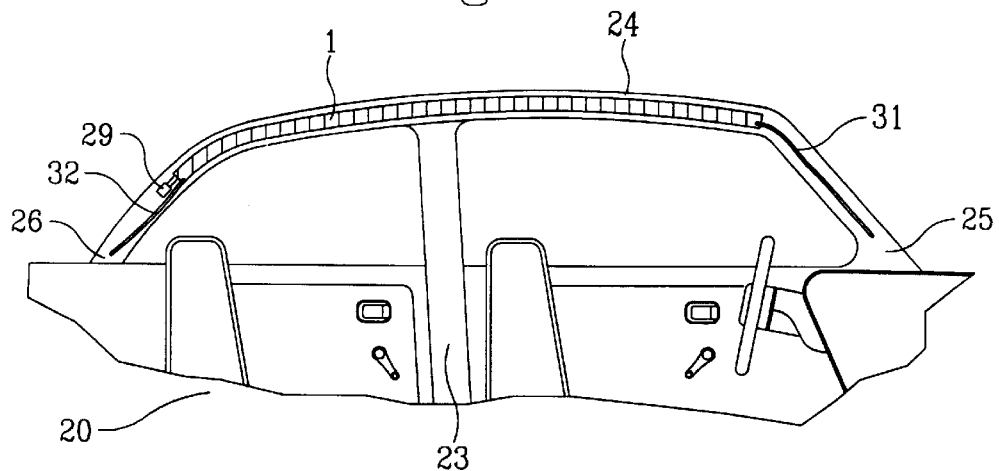
FIG. 1 is an elevation view of a side impact air bag of the present invention mounted to an automotive vehicle in a stored position.

FIG. 1 is directed to an air bag of the present invention mounted to an automotive vehicle in a stored non-deployed state. An automobile 20, has a front pillar 25, a rear pillar 26 and a center pillar 23. An air bag 1 is stored and mounted to the vehicle roof rail 24. A front portion 31 of a tether/lace is connected to a front portion of the air bag 1 and to the front pillar 25. A rear portion 32 of the tether/lace is connected to a rear portion of the air bag 1 and to the rear pillar 26. The rear portion of the air bag 1 is connected to a gas generator 29, or a duct leading from a gas generator to facilitate ingress of gas to the airbag 1.

The air bag 1 is stored in a compartment mounted to the roof rail 24 as shown in FIG. 1. Front and rear portions 31,32 of the tether/lace are also stored in a compartment in a corresponding pillar 25, 26. When a side impact is detected, the air bag 1 is inflated by gas from generator 29. As the air bag 1 inflates, it drops downward and is positioned and retained by the tethers 31, 32 as well as the point-wise mounting connections 7. As gas fills the inflatable element 1, the air bag 1 expands and a distance between a plurality of discretely positioned tether/lace guides increases. Thus, the length of the tether/lace required to span the length of the air bag 1 increases. Consequently, any slack in the tether/lace existing when the air bag 1 descends from its stored position is taken up by the expanding air bag 1 and the increased distance between the tether/lace guides. Note that the tethers 131, 132 are taut in the inflated state as shown in FIG. 2B. The air bag 101 is thereby positioned between the occupant and the door or window opening to protect the occupant from side impacts and subsequent events, such as rollover or secondary impact.

Figure 2A:
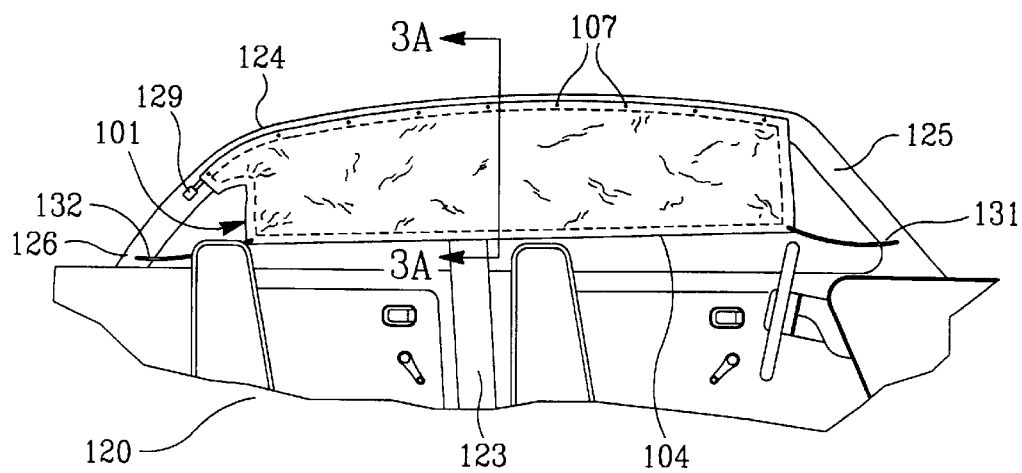
FIG. 2A is an elevation view of a side impact air bag according to one embodiment of the present invention mounted to a vehicle in a deployed non-inflated state.
Figure 2B:
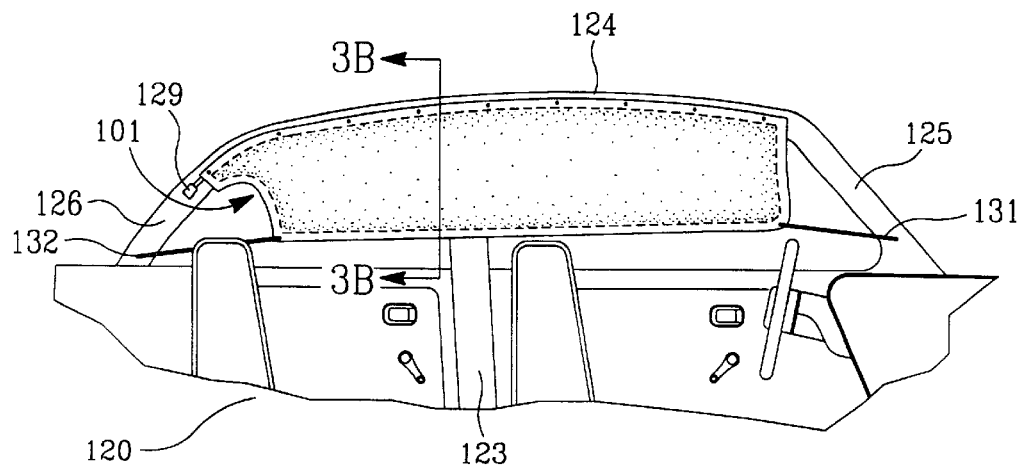
FIG. 2B is an elevation view of the side impact air bag of FIG. 2A in an inflated state.

FIGS. 2A–2B is directed to a side impact air bag 101 of the present invention. Preferably the front and rear portions 131, 132 of the tether/lace secures the air bag 1 between the A-pillar 125 and C-pillar 126 spanning the B-pillar 123. However, the air bag 101 may be made to extend more rearwardly and secured to a D-pillar of a longer vehicle. Furthermore, the airbag 101 may be employed only in the forward compartment of the vehicle and connected to the A-pillar and B-pillars. It is preferred, however, to employ a single air bag 101 for both the front and rear passenger compartments, and therefore connect the inflatable element to the A-pillar (or front pillar 125) and the C-pillar (rear pillar 126).

The air bag 101 may be made of any suitable air bag material for holding gas, but is preferably made of a plurality of sheets of woven nylon fabric lined with urethane or other substantially impervious material such as silicone. The urethane coated nylon sheets are secured to one another along an outer periphery thereof to define the overall air bag shape. The sheets are connected along the pattern shown in dotted lines in FIGS. 2A–2B. Preferably, the nylon sheets are secured to one another by heating selected portions of the fabric dialectrically. The urethane or silicone coating of each of the two nylon sheets is laid against each other and together line the interior of the air bag 101. The air bag 101 is then dialectrically treated to heat the outer causing the coating to adhere to one another. This forms a gas tight seal along the outer peripheral surface. The coated nylon sheets may also be stitched along the outer periphery to increase structural integrity sufficient to tolerate loads during inflation. When stitching is employed, it is preferred to treat the stitched area with a gas impervious substance to minimize gas leakage. Otherwise, the stress induced during inflation causes small holes in the stitching to widen and permit gas to escape thereby increasing deflation time. A bladder may also be used to line the inner surface of the air bag to maintain the air bag in an inflated state for a longer period of time.

The front and rear portions 131, 132 of the tether/lace form a part of a single woven cord or fabric laced about a plurality of discrete points on the air bag 101. As the air bag 101 inflates, the distance between the discrete points increases and slack is taken up in the tether/lace. Note in the deflated state of FIG. 2A, the front and rear portions 131, 132 of the tether/lace are slack. However, when the air bag 101 is inflated as illustrated in FIG. 2B, any slack in the tether/lace between the front and rear portions 131, 132 is taken up and the tether/lace is taut thereby positioning the air bag 101 within the vehicle and holding the air bag 101 in place. The preferred embodiments for weaving the tether/lace about the air bag 101 will now be discussed.

Figure 3A:
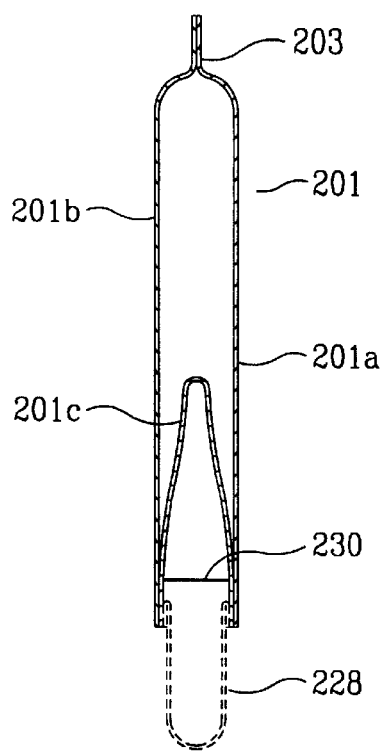
FIG. 3A is a cross sectional view of the side air bag of FIG. 2A taken along section lines 3A—3A.

FIG. 3A represents a cross sectional view of an air bag 201 in a deflated state. The air bag 201 is comprised of three panels 201a, 201b, and 201c sewn together. An inboard panel 201 a, which faces the inner compartment of the vehicle, is sewn to an outboard panel 201b along a top edge 203 of the air bag 201. A bottom panel 201c is sewn to each of the inboard 201a and outboard 201b panel forming a connection there between and defining the boundaries of the air bag 201. A plurality of grommets 235 (tether/lace guides) are formed in a portion of the waste area outside of the stitching connecting the bottom panel 201c with each of the inboard 201a and outboard panel 201b. The tether/lace 230 is woven through the grommets 235 traversing the air bag 201 a number of times as the tether/lace 230 extends the length of the air bag 201 emerging to the front and rear portions thereof 131, 132 for connection to the front and rear pillars 125, 126 respectively. Preferably, a pair of grommets 235 are disposed immediately adjacent one another to allow the tether/lace 230 to immediately pass back through the bottom portion of the air bag 201. Such an arrangement limits the exposure of the tether/lace 230 and helps prevent the tether/lace 230 from rubbing against the air bag or otherwise causing kinking.

As can be seen in FIG. 3A the distance between the inboard panel 201a and outboard panel 201b adjacent the bottom panel is relatively small in the deflated state. Such an arrangement allows the air bag 201 and tether/lace 230 to be stored up through the front and rear pillars 125, 126 and roof rail 124 in a non-deployed stored state. However, when the air bag is deployed, as shown in FIG. 2B, a smaller distance spans directly between the front and rear pillars 125, 126. Therefore, slack must be taken up during inflation to provide tension in the tether/lace 230 to maintain the air bag 201 in proper position.

Figure 3B:
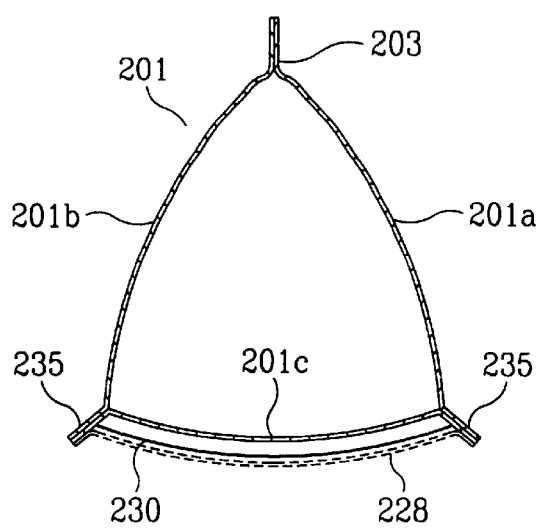
FIG. 3B is a cross sectional view of the side air bag of FIG. 2B taken along section lines 3B—3B.

Referring now to FIG. 3B, the air bag 201 is in an inflated state. Thus the distance between the grommets 235 on the inboard side of the air bag and the outboard side of the air bag is significantly greater. Thus the distance the tether/lace 230 must span is increased and slack is therefore taken up. The distance that the tether/lace 230 traverses as the air bag inflates, above that of a straight line between the connection points of the front and rear pillars 125, 126, is greater than the increased distance that the tether/lace 230 must span when stored up through the front and rear pillars 125, 126 and across the roof rail 124. This facilitates easy storage of the air bag 201 and tether/lace 230 in the roof rail 124 while providing ample slack take up during air bag inflation. This results in an air bag 201 that is easily folded and stored in the roof rail and having sufficient tension in the tether/lace 230 when inflated to hold and maintain the air bag 201 in a proper position.

A protective cover 228 may be disposed over the bottom panel 201c sandwiching the tether/lace 230 there between. Such an arrangement isolates the tether/lace 230 during deployment and prevents foreign objects from inhibiting the relative movement of the tether/lace 230 relative to the air bag 201 during inflation thus inhibiting kinking.

Figure 4A:
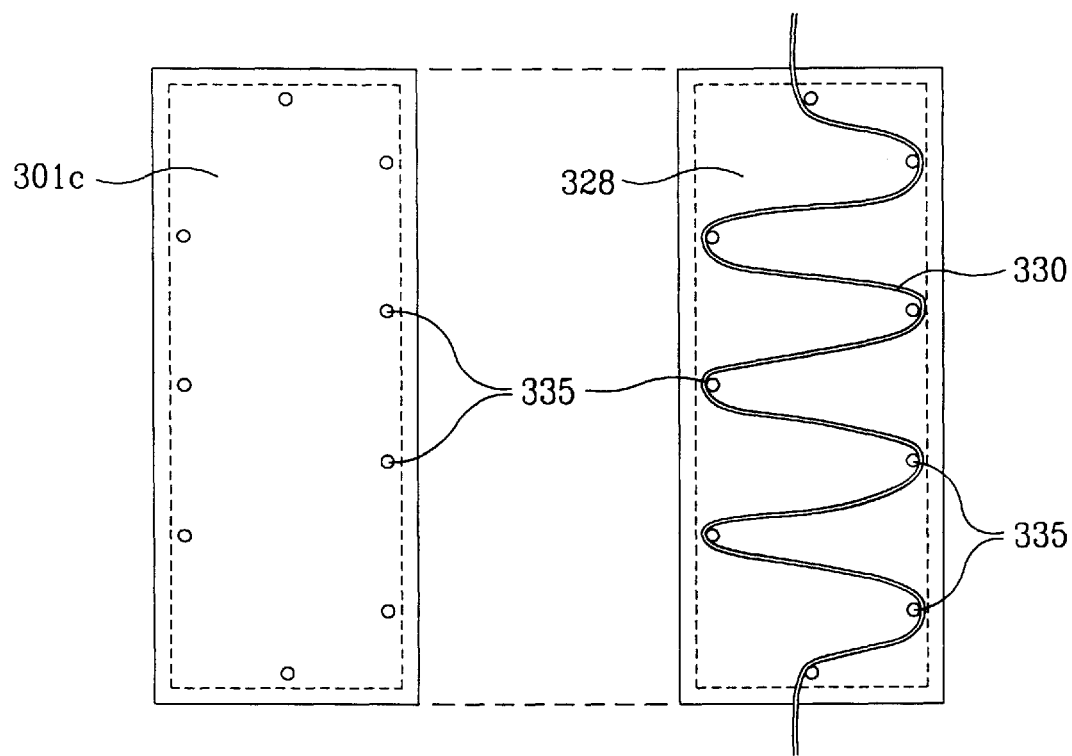
FIG. 4A is an exploded plan view of the bottom portion of the side air bag according to an alternative embodiment according to the present invention.
Figure 4B:
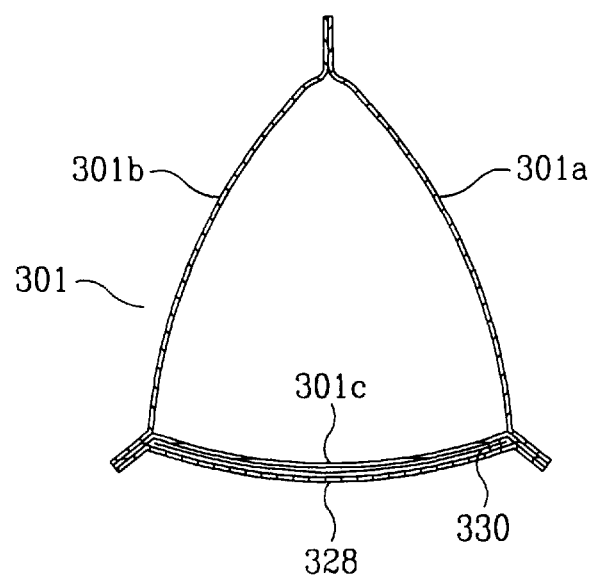
FIG. 4B is a cross sectional view of the air bag according to the alternate embodiment of FIG. 4A.

FIGS. 4A and 4B represent an alternate embodiment for lacing the tether/lace 330 along the air bag 301. In this embodiment the tether/lace 330 traverses a plurality of discrete points or lace guides 335 in a serpentine fashion. The discrete points or lace guides 335 are formed by firmly stitching the bottom panel 301c and a protective cover 328 together at each of the lace guides/points 335. When the air bag 301 is uninflated, the inboard and outboard sides of the bottom panel 301c and protective cover 328 are closer together similar to the embodiment of FIG. 3A. Thus the length of the tether/lace 330 needed to span the air bag 301 in a deflated/stored state is shorter than when inflated. This allows the tether/lace 330 to be stored up through the pillars 125, 126 and along the roof rail. When the air bag 301 inflates, the inboard and outboard sides of the bottom panel 301c and protective cover 328 move apart and the tether lace 330 must traverse the width of the bottom panel 301c a number of times proportionate to the number of guides 335. Increasing the number of guides 335 will increase the length of tether/lace 330 needed to span the air bag 301 and the amount of slack take-up during inflation. Such an arrangement eliminates the need for grommets and any exposure of the tether/lace 330 to the interior of the vehicle along the length of the air bag 301.

Figure 5A:
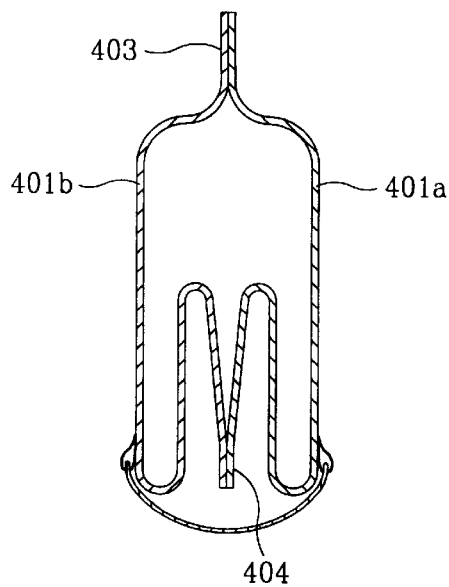
FIG. 5A is a cross sectional view of the air bag according to an alternate embodiment in a deflated state.
Figure 5B:
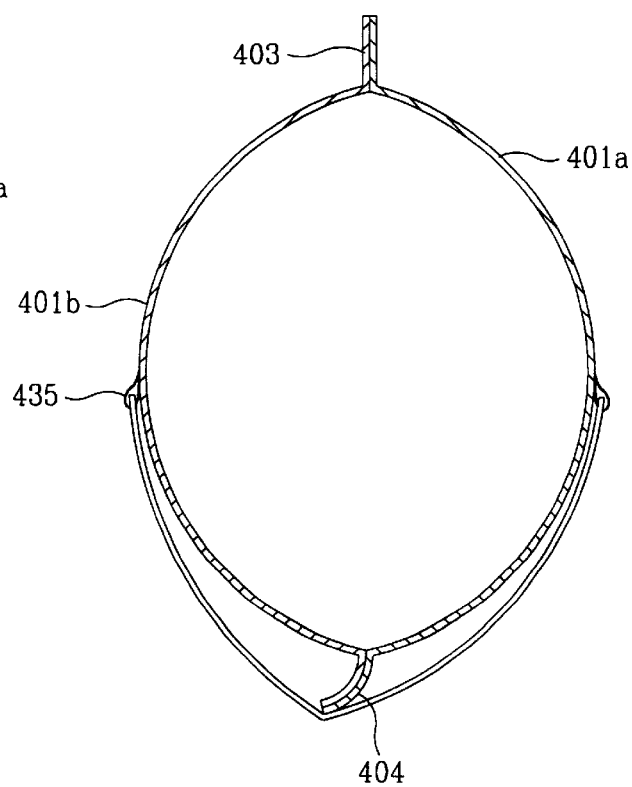
FIG. 5B is a cross sectional view of the air bag of FIG. 5A by in an inflated state.
Figure 5C:
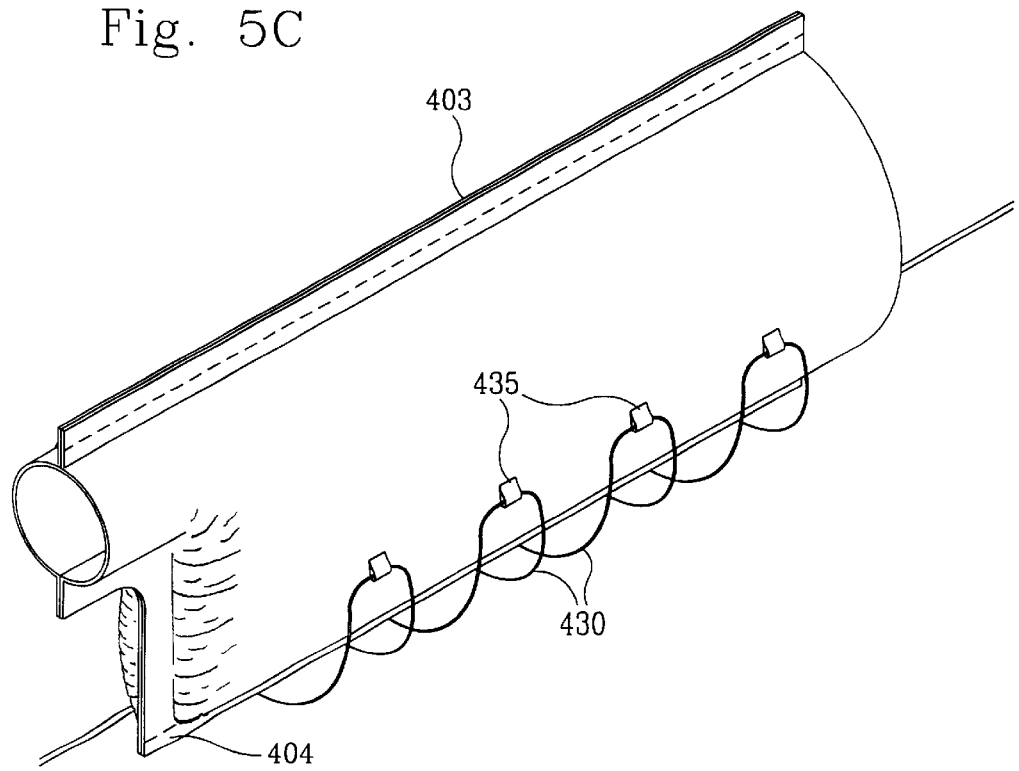
FIG. 5C is an elevational perspective view of the air bag of FIG. 5B.

FIGS. 5A–5C represents another embodiment of the present invention. In this embodiment, the air bag 401 comprises two panels. An inboard panel 401a is secured to an outboard panel 401*b* along a top edge 403 and bottom edge 404. A plurality of tether/lace guides 435 are formed on both sides of the air bag 401*a*,401*b*. The guides 435 are preferably formed of fabric looped back onto itself and stitched to the side of the air bag 401. The fabric guide 435 is preferably made of the same material as the air bag 401. The tether/lace 430 is simply fed through each fabric guide 435 traversing the bottom edge 404 of the air bag 401 between each successive guide 435 as illustrated in FIG. 5C. As in the previous embodiments, when the air bag 401 is deflated, the distance between the guides 435 is small whereas when the air bag 401 is inflated, the span increases requiring a greater length of the tether/lace 435 to span the overall length of the air bag 401.

Such an arrangement provides an added benefit as the tether/lace 435 may be secured to the side of the air bag without the need for a zero length tether. If a grommet or slit were used as a guide 435 and the tether/lace 430 fed there through, the integrity of the air bag would be compromised and air would escape thus defeating the utility of the air bag. To avoid such a breach, a zero length tether must be formed about the guide point should a grommet or simple slit be employed. The present embodiment eliminates the need for a zero length tether. However, the present embodiment does not exclude the use of a zero length tether and may so be employed together with the present arrangement.

Figure 3C:
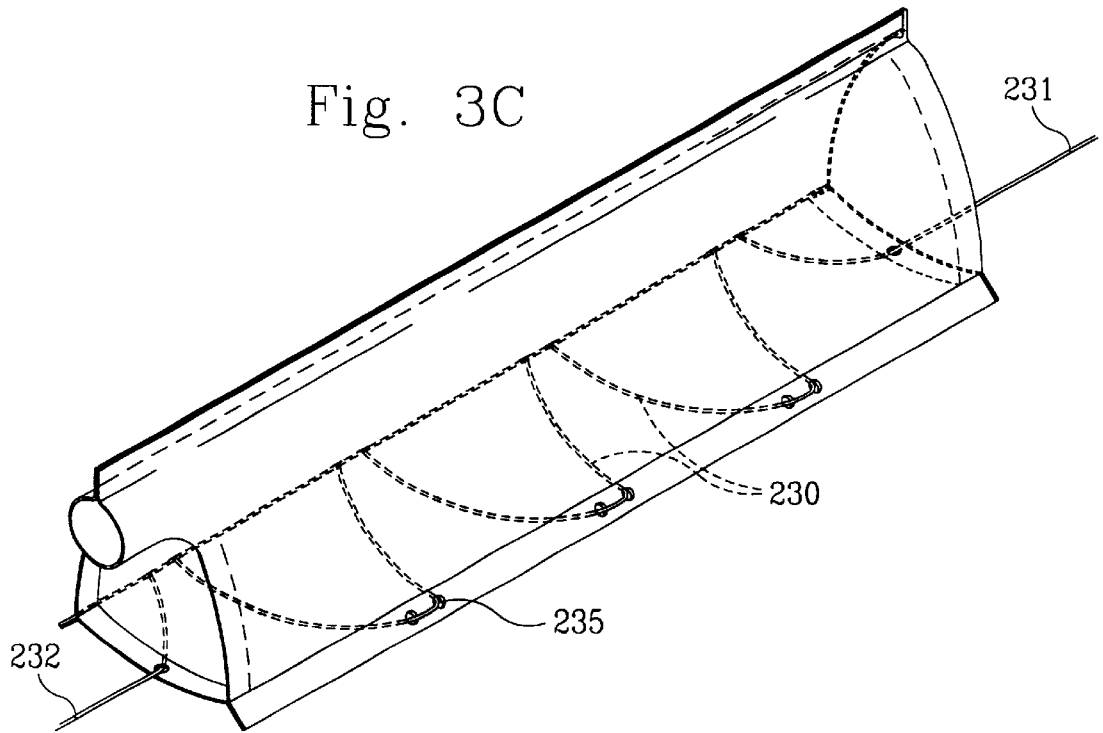
FIG. 3C is an elevational perspective view of the air bag of FIG. 2B.
Figure 6A:
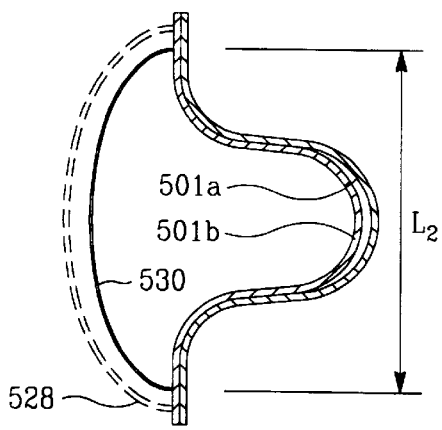
FIG. 6A is a cross sectional view of the air bag according to an alternate embodiment in a deflated state.
Figure 6B:
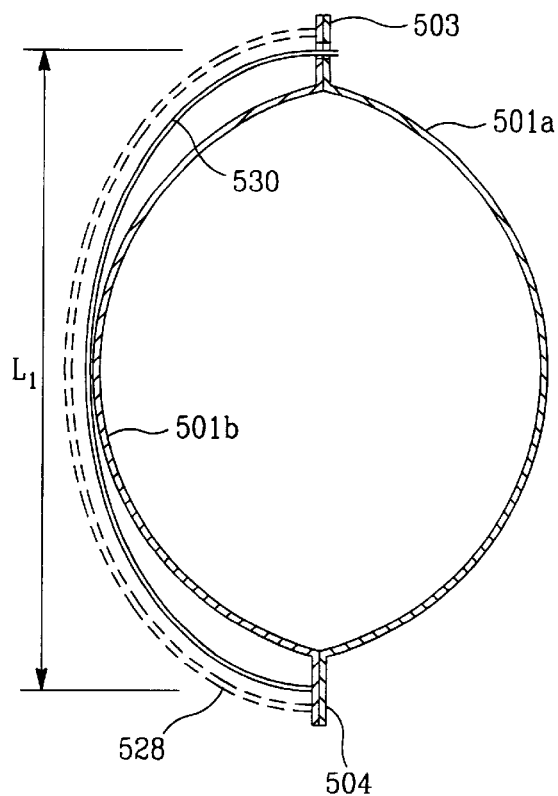
FIG. 6B is a cross sectional view of the air bag of FIG. 6A in an inflated state.
Figure 6C:
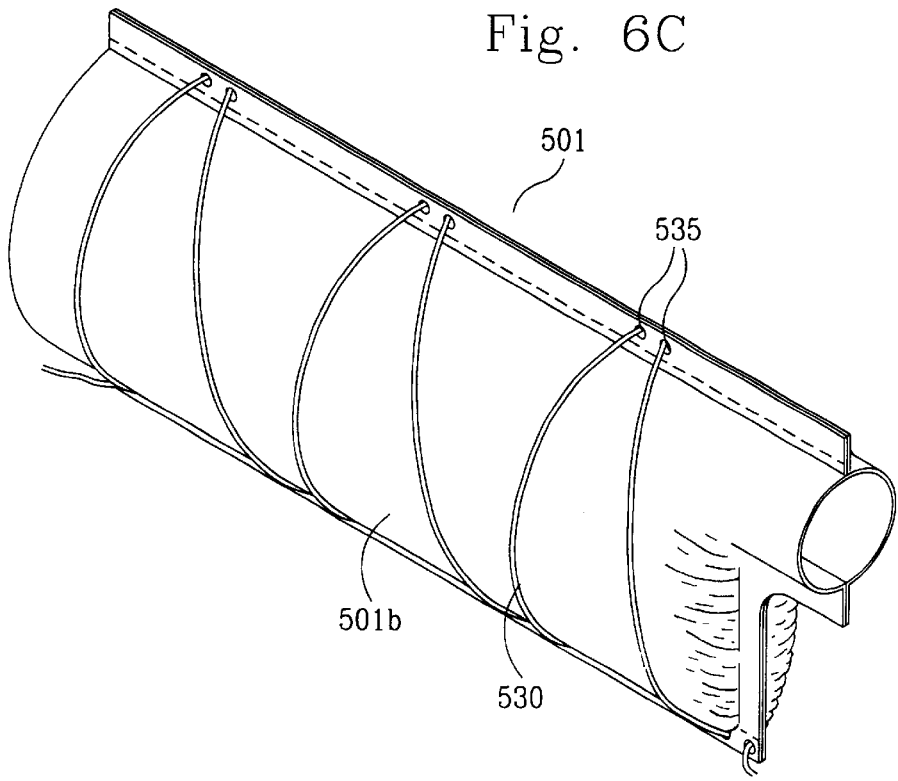
FIG. 6C is an elevational perspective view of the air bag of FIG. 6B.
Figure 7A:
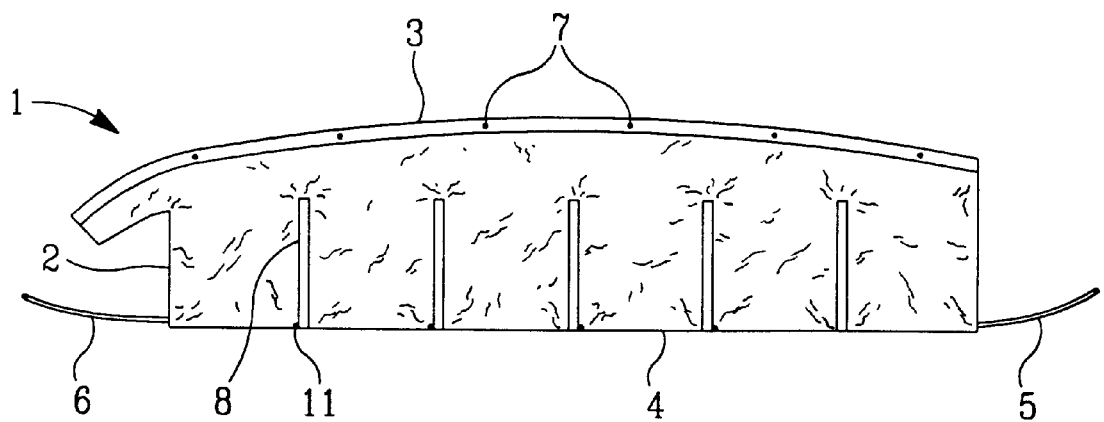
FIG. 7A is an elevation view of a side impact air bag of the related art in a non-inflated stated.
Figure 7B:
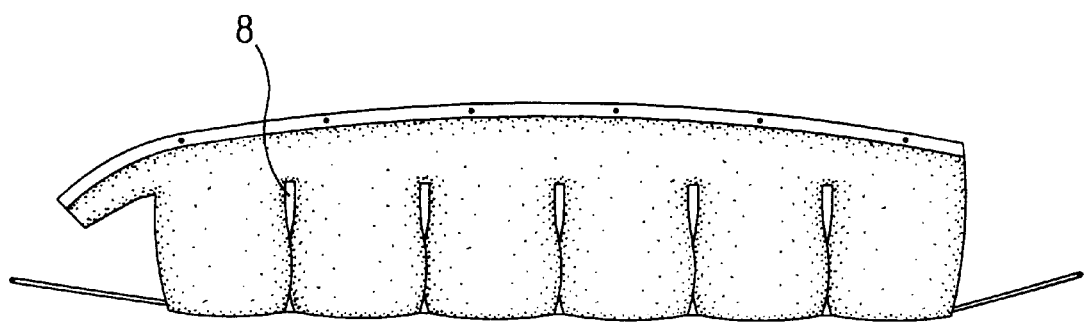
FIG. 7B is an elevation view of the side impact air bag of FIG. 6A in an inflated state

FIGS. 6A–6C represent yet another embodiment of the present invention. As in the embodiment of FIGS. 5A–5C, a two-panel air bag 501 is employed. Inboard panel 501*a* is secured to an outboard panel 502*b* along a top edge 503 and bottom edge 504. The two panels are simply stitched together, or as previously discussed, may be dielectrically adhered to one another in addition to the stitching. A plurality of tether/lace guides 535 are formed along the top edge 503 and bottom edge 504 of the air bag 501 in a similar fashion to the embodiment of FIG. 3C. That is, the guides 535 are formed outside of the stitching in a waste area unexposed to the internal pressure of the inflating gas. Moreover, a plurality of fabric loop guides may be used in a similar fashion as shown in the previous embodiment.

The tether/lace 530 is fed through the guides 535 only along the inboard panel 501*b*. Such an arrangement removes the exposure of the tether/lace 530 to the inside of the vehicle. Therefore, a pair of immediately adjacent guides 535 is formed at each point along the top and bottom edges of the air bag. Such an arrangement allows the tether/lace 530 to be immediately fed back through the edge of the air bag 501 and to be maintained on the outboard side 501*b* of the air bag. A protective cover 528 may also be employed to isolate the tether/lace 530 within the air bag 501.

As illustrated in FIGS. 6A and 6B, the distance between the top edge 503 and bottom edge 504 changes between the uninflated and deflated states. L1 represents a distance between the top and bottom edge of the air bag when inflated. However, the distance between the top edge 503 and bottom edge 504 when uninflated is significantly smaller as illustrated by reference L2. Of course, the air bag 501 may be folded to position the top 503 and bottom 504 edges immediately adjacent one another thereby substantially reducing the length there between. Such an arrangement increases the amount of slack take up in the tether/lace 530 when the air bag inflates from its uniflated stored state in the roof rail.

The material used for the tether/lace, in each of the aforementioned embodiments, may be that as is known in the art. A water based Teflon coated thick nylon tape or other strong woven fabric or cord may be employed. It is preferable that the tether/lace have no substantial independent elastic properties. That is, the tether/lace should be able to endure the desired tension without significant elongation or substantially shrinkage when tension is relieved. It is also desirable to have a strong flexible material having an external surface of relatively low frictional characteristics to facilitate easy movement relative to the air bag and guide points. It is also noted that the tether/lace may be secured to the pillars in any suitable fashion known in the art.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A supplemental restraint assembly disposed between a front and a rear pillar within a vehicle, said assembly comprising:

an inflatable air bag connected to an inflator, said inflator adapted to inflate said inflatable air bag from an uninflated state to an inflated state;

a plurality of guides formed on said inflatable air bag along a length thereof; and at least one tether secured to said inflatable air bag and laced about said plurality of guides, said tether being secured to said front and rear pillars to form a connection there between;

wherein when said inflatable air bag inflates, a distance between at least two of said plurality of guides increases to take up slack in said tether and induces tension in said tether to positively position and retain said air bag relative to said vehicle.

2. The supplemental restraint assembly according to claim 1, wherein said air bag includes:

an inboard panel secured to an outboard panel along a top edge of said air bag, and a bottom panel secured to each of said inboard and outboard panels along a bottom edge of said air bag thereby forming at least a three panel air bag, said plurality of guides being formed on said air bag adjacent a connection between said bottom panel and each of said inboard and outboard panels, said tether traversing said bottom panel between said inboard and outboard panels in a serpentine fashion about said guides.

3. The supplemental restraint assembly according to claim 2, wherein said assembly further comprises a protective cover disposed on and secured to said bottom panel, said protective cover substantially covers said tether in an area adjacent said bottom panel.

4. The supplemental restraint assembly according to claim 2, wherein said plurality of guides includes a plurality of grommets formed in a waste area external said connection between said bottom panel and said inboard and outboard panels.

5. The supplemental restraint assembly according to claim 2, said assembly further including a protective cover disposed on and secured to said bottom panel, each of said plurality of guides being defined by a stitching between said bottom panel and said protective cover, said tether being disposed between said bottom panel and said protective cover and laced about said stitchings in a serpentine fashion.

6. The supplemental restraint assembly according to claim 1, wherein said plurality of guides are each formed of a fabric loop secured to said air bag.

7. The supplemental restraint assembly according to claim 6, wherein said plurality of fabric loops are disposed on an inboard and outboard side of said air bag, said tether traversing said air bag between said guides about a bottom portion of said air bag.

8. The supplemental restraint assembly according to claim 1, wherein said plurality of guides are disposed adjacent a top edge and a bottom edge of said air bag, said tether traversing said guides and being disposed adjacent an outboard side of said air bag and being substantially unexposed to an inboard side of said air bag.

9. The supplemental restraint assembly according to claim 1, wherein said air bag includes:

an inboard panel connected to an outboard panel along a top edge and a bottom edge of said air bag to define a two panel air bag.

10. The supplemental restraint assembly according to claim 9, wherein said plurality of guides are disposed adjacent a top edge and a bottom edge of said air bag, said tether traversing said guides and being disposed on an outboard side of said air bag adjacent said outboard panel and being substantially unexposed to an inboard side of said air bag adjacent said inboard panel.

11. The supplemental restraint assembly according to claim 10, wherein said inboard and outboard panels are stitched together along said top and bottom edges of said air bag, said plurality of guides being a plurality of grommets secured to a waste area external said stitching between said inboard and outboard panels along said top and bottom edges of said air bag.

12. The supplemental restraint assembly according to claim 9, wherein said plurality of guides are each formed of a fabric loop secured to said air bag and being disposed on each of said inboard and outboard panels of said air bag, said tether traversing said air bag between said guides about a bottom portion of said air bag.

13. A supplemental restraint assembly for a vehicle, said vehicle including a front and rear pillar and a roof rail extending between said pillars, said supplemental restraint assembly comprising:

an inflatable air bag secured to said roof rail and adapted to be substantially stored adjacent thereto in an uninflated state, said inflatable air bag including a plurality of guides formed thereon; and an inflator in communication with said air bag, said inflator adapted to inflate said air bag to an inflated state;

at least one tether secured to said air bag and said front and rear pillars, said tether being stored up through said pillars and along said roof rail when said air bag is in said uninflated state, said tether traversing said guides on said air bag in a serpentine fashion;

wherein when said air bag inflates, said air bag drops down from said roof rail toward an interior of said vehicle and a distance between said plurality of guides increases to take up slack in said tether and induce tension in said tether to positively position and retain said air bag relative to said vehicle in said inflated state.

* * * * *